United States Patent
Baldwin et al.

(12)

(10) Patent No.: US 6,696,861 B1
(45) Date of Patent: Feb. 24, 2004

(54) SWITCH MODE REGULATOR CONTROLLER USING HYBRID TECHNIQUE

(75) Inventors: David J. Baldwin, Allen, TX (US); Zbigniew J. Lata, Plano, TX (US); Sanmukh M. Patel, Richardson, TX (US); Ross E. Teggatz, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/285,900

(22) Filed: Nov. 1, 2002

(51) Int. Cl.[7] .............................................. H03K 17/16

(52) U.S. Cl. .............................. 326/83; 326/86; 326/27

(58) Field of Search ............................. 326/82, 83, 86, 326/26, 27

(56) References Cited

U.S. PATENT DOCUMENTS

| 4,948,991 | A | * | 8/1990 | Schucker et al. | 326/89 |
| 5,122,690 | A | * | 6/1992 | Bianchi | 326/87 |
| 6,486,699 | B1 | * | 11/2002 | Friebe et al. | 326/32 |
| 6,489,809 | B2 | * | 12/2002 | Kiehl | 326/83 |

* cited by examiner

*Primary Examiner*—Don Le
(74) *Attorney, Agent, or Firm*—Alan K. Stewart; W. James Brady III; Frederick J. Telecky, Jr.

(57) ABSTRACT

A switch mode controller circuit includes: a hysteretic comparator HYST_COMP for monitoring an output of a switch mode circuit; a standard comparator PHASE_COMP for monitoring a phase of the switch mode circuit; a logic block having a first input coupled to a clock signal generator Oscillator, a second input coupled to an output of the hysteretic comparator HYST_COMP, and a third input coupled to an output of the standard comparator PHASE_COMP, wherein the logic block generates switching cycles based on a fixed ON/OFF time during a first part of a cycle and based on a hysteretic control during a second part of the cycle.

6 Claims, 1 Drawing Sheet

SWITCH MODE REGULATOR CONTROLLER USING HYBRID TECHNIQUE

FIELD OF THE INVENTION

This invention generally relates to electronic systems and in particular it relates to a switch mode regulator with a hybrid hysteretic controller.

BACKGROUND OF THE INVENTION

The classical prior art voltage mode control for a switch mode regulator does not perform to tight output voltage tolerance requirements during load transients. The standard prior art hysteretic control for a switch mode regulator maintains a better regulation of voltage tolerance, but causes extreme switching frequencies.

SUMMARY OF THE INVENTION

A switch mode controller circuit includes: a hysteretic comparator for monitoring an output of a switch mode circuit; a standard comparator for monitoring a phase of the switch mode circuit; a logic block having a first input coupled to a clock signal generator, a second input coupled to an output of the hysteretic comparator, and a third input coupled to an output of the standard comparator, wherein the logic block generates switching cycles based on a fixed ON/OFF time during a first part of a cycle and based on a hysteretic control during a second part of the cycle.

DETAILED DESCRIPTION OF PREFERRED EMBODIMENTS

Figure 1:
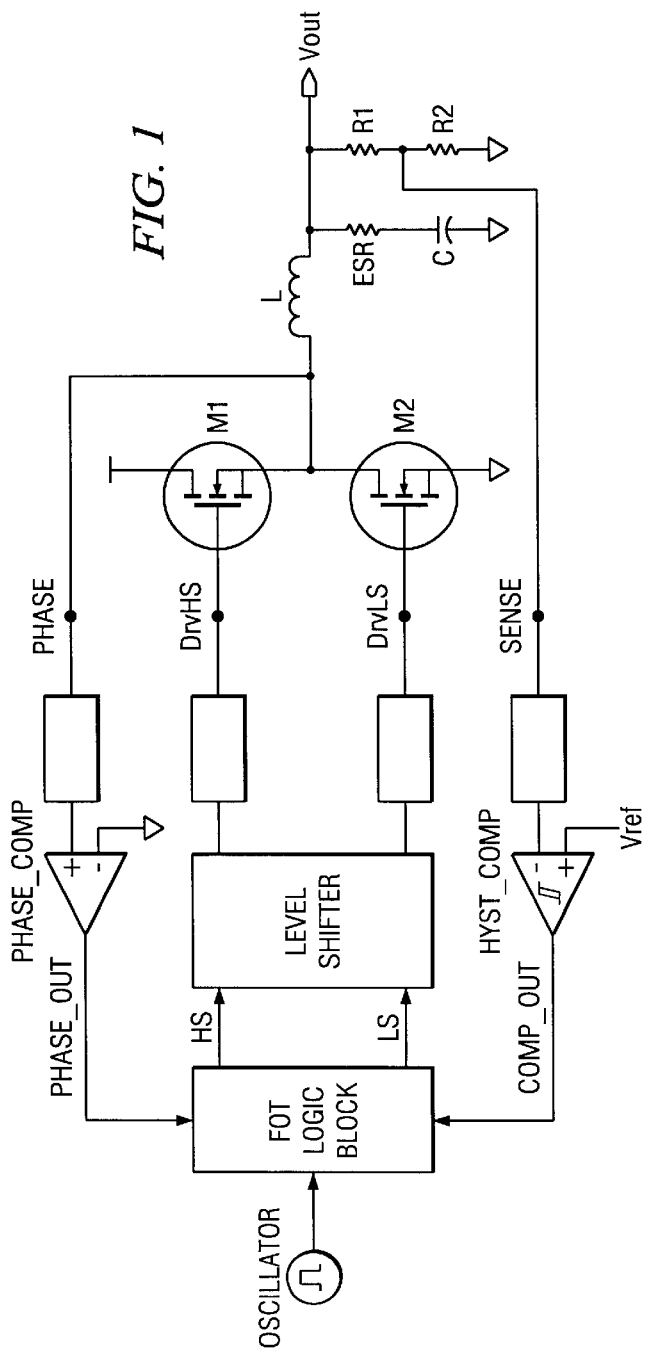
FIG. 1 is a schematic circuit diagram of a preferred embodiment Forced_On_Time/Forced Off Time/ Hysteretic synchronous buck switch mode device.

A preferred embodiment hybrid Forced_On$_{13}$ Time/ Forced_Off_Time/Hysteretic synchronous buck switch mode device is shown in FIG. 1. The device of FIG. 1 utilizes a comparator with hysteresis HYST_COMP, a comparator PHASE_COMP, a forced_on_time/forced_ off_time (FOT) Logic Block, a clock generator (Oscillator), a voltage Level Shifter, two FET drives M1 and M2, and LC output filter which includes inductor L, capacitor C, and resistance ESR. Voltage divider resistors R1 and R2 provide a feedback signal SENSE to the controller.

The comparator HYST_COMP reads feedback voltage SENSE for monitoring output voltage Vout. Based on the level of voltage SENSE with respect to an internal reference voltage VREF, comparator HYST_COMP changes its output. When voltage SENSE is lower than voltage VREF, signal COMP_OUT is in High state. Otherwise signal COMP_OUT is Low. Comparator HYST_COM implements input voltage hysteresis.

The comparator PHASE_COMP compares pin voltage PHASE to a circuit ground. When voltage PHASE is positive, signal PHASE_OUT is in High state. Otherwise it is Low.

The Level Shifter converts the digital control signals HS and LS into analog switching signals DrvHS and DrvLS respectively.

The FOT Logic Block is a sequential digital circuit that generates switching cycles to control the gates of external FETs M1 and M2 based on signals COMP_OUT and PHASE_OUT. To optimize output filter elements L and C, the voltage mode control is based on a fixed ON/OFF time during the start of a cycle and a hysteretic control during the rest of the cycle.

Figure 2:
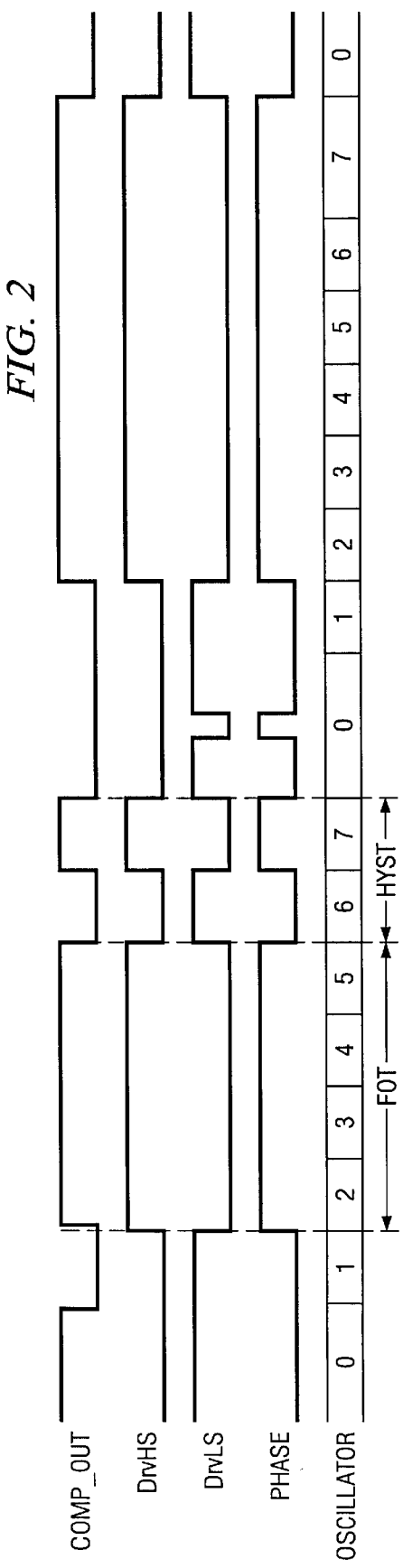
FIG. 2 is a timing diagram describing the operation of the device of FIG. 1.

The timing diagram shown in FIG. 2 describes the operation of the controller of FIG. 1. FIG. 2 shows a plot of signals COMP_OUT, DRVHS, DRVLS, PHASE, and OSCILLATOR (clock signal). Each cycle in FIG. 2 contains at least eight positive clock edges of the internal clock generator. Clock edges 2, 3, 4, 5 and 6 are designated to provide a Forced_On/Forced_Off time FOT type of the controller functionality. In this manner, when the feedback signal SENSE drops below the comparator HYST_COMP threshold VREF, the high side FET M1 will be asserted High for at least four internal positive clock edges. If the feedback signal SENSE is above the threshold VREF, the high side FET M1 will de-assert after 4 clock counts have expired. If the feedback signal SENSE is not above the threshold VREF, high side FET M1 will stay ON until such time that signal SENSE exceeds the threshold VREF. Once the high side FET M1 has de-asserted, it cannot re-assert until a forced off time of one positive clock edge has expired. The remainder of the period will be operating in a classical hysteretic mode (for 2 internal clock cycles).

Clock edges 7 and 0 are designated to provide a hysteretic HYST type of controller functionality. In this manner, when signal SENSE drops below threshold VREF, the high side FET M1 will be asserted for one positive clock edge. If signal SENSE continues to be below threshold VREF, high side FET M1 will be asserted High for another positive clock edge. Otherwise it will be de-asserted. If the feedback signal SENSE is above the threshold VREF at the end of the hysteretic cycle, the high side FET M1 will remain Low until such time that the feedback signal SENSE drops below the comparator threshold VREF. Thus another hybrid Forced_ On_Time/Forced_Off_Time/Hysteretic cycle starts.

The synchronous FET drive (the low side transistor M2) is asserted complementary to the high side FET drive (FET M1) with an anti-cross-conduction circuit implementation in Level Shifter to prevent shoot-through current. The comparator PHASE_COMP monitors the freewheeling node to detect when the inductor current changes direction. In this way, the low side FET drive is terminated once the inductor current decays to zero.

The preferred embodiment solution prevents the inductor L from totally drying up and causing the switching frequency to vary extremely on a cycle-by-cycle basis. The compulsory "ON" and "OFF" system referenced to the internal clock forms an integral part of the topology. This solution allows for a better transient response and compensates for different bulk capacitance usage (ESR variation between capacitors). This solution balances the ability to maintain a tight output regulatory voltage within a range of switching frequency.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A switch mode controller circuit comprising:

a hysteretic comparator for monitoring an output of a switch mode circuit;

a standard comparator for monitoring a phase of the switch mode circuit;

a logic block having a first input coupled to a clock signal generator, a second input coupled to an output of the hysteretic comparator, and a third input coupled to an output of the standard comparator, wherein the logic block generates switching cycles based on a fixed ON/OFF time during a first part of a cycle and based on a hysteretic control during a second part of the cycle.

2. The device of claim 1 further comprising a level shifter for converting digital output signals from the logic block into analog switching signals.

3. The device of claim 1 wherein the switch mode circuit comprises:

a high side driver;

a low side driver coupled to the high side driver;

an inductor coupled having a first end coupled between the high side driver and the low side driver;

a capacitor coupled to a second end of the inductor; and a feedback circuit coupled to the second end of the inductor.

4. The device of claim 3 wherein the standard comparator has an input coupled to the first end of the inductor.

5. The device of claim 3 wherein the hysteretic comparator has an input coupled to the feedback circuit.

6. The device of claim 3 wherein the feedback circuit is a voltage divider.

* * * * *